UNITED STATES PATENT OFFICE 2,065,680

MONO-AZODYESTUFFS

Richard Fleischhauer, Frankfort-on-the-Main-Fechenheim, Germany, assignor to General Aniline Works, Inc., New York, N. Y., a corporation of Delaware No Drawing. Application July 6, 1935, Serial No. 30,159. In Germany July 14, 1934

4 Claims. (Cl. 260—92)

My present invention relates to monoazodyestuffs more particularly to those of the general formula:

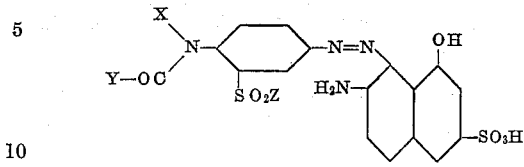

wherein X represents hydrogen or an alkyl, aralkyl, hexahydrophenyl or phenyl radicle, Y the methyl or phenyl radicle and Z represents OH or the grouping

$R_1$ and $R_2$ standing for hydrogen, alkyl or cycloalkyl which dyestuffs are water-soluble mostly reddish brown powders and dye the animal fibers very equal and bright reddish shades of the desired yellowish tinge. They are obtained by combining in an acid medium diazocompounds of amines of the formula:

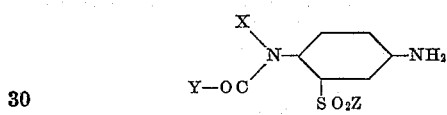

wherein X, Y, and Z have the aforesaid signification, with 2-amino-8-hydroxynaphthalene-6-sulfonic acid. These amines may be prepared as follows: Either the 1-chloro-4-nitrobenzene-2-sulfonic acid is condensed with aliphatic, hydroaromatic or aromatic amines and the formed condensation products are acylated and reduced, or the 1-chloro-4-nitrobenzene-2-sulfonic-acid chloride is decomposed with amines, the chlorine atom is replaced by an amino or substituted amino group for instance by treating with the amine under superatmospheric pressure and the condensation product is acylated and finally reduced.

In order to further illustrate my invention the following examples are given, the parts being by weight and all temperatures in centigrade degrees; but I wish it, however, to be understood that my invention is not limited to the examples given, nor to the exact conditions stated therein.

Example 1

37.6 parts of 1-amino-4-acetyl-N-cyclohexylamino-benzene-3-sulfonic acid are dissolved in water with the addition of a sufficient quantity of sodium carbonate and while cooling with ice they are diazotized by means of hydrochloric acid and 6.9 parts of sodium nitrite. Then the formed diazocompound is combined in a weakly mineral acid medium with a suspension of 24 parts of 2-amino-8-hydroxynaphthalene-6-sulfonic acid. After stirring for some hours the formed dyestuff is isolated after the addition of sodium acetate or sodium carbonate. It corresponds to the formula:

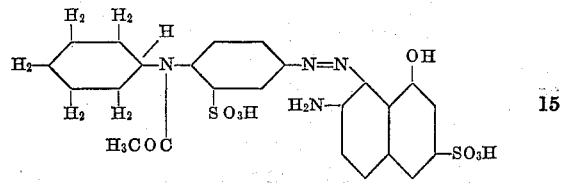

It is when dry a reddish brown water soluble powder and dyes wool and silk from an acid bath bright scarlet shades of a good fastness to light, washing and perspiration.

Very similar dyestuffs are obtained by using for instance as diazocomponent the diazocompound of 1-amino-4-acetyl-N-n-butylaminobenzene-3-sulfonic acid, 1-amino-4-acetyl-N-phenyl-aminobenzene-3-sulfonic-acid, 1-amino-4-acetyl-N-methylaminobenzene-3-sulfonic acid and 1-amino-4-acetyl-N-benzylamino-benzene-3-sulfonic acid, 1-amino-4-methoxyacetyl-N-methylaminobenzene-3-sulfonic-acid and 1-amino-4-carbethoxy-N-methyl-amino-benzene-3-sulfonic acid.

Example 2

The diazocompound of 32 parts of 1-amino-4-acetyl-N-ethyl-aminobenzene-3-sulfonic acid is combined in a mineral acid medium with a suspension of 24 parts of 2-amino-8-hydroxy-naphthalene-6-sulfonic acid. When the combination has been finished the dyestuff is isolated by adding common salt to the reaction mass. It corresponds to the formula:

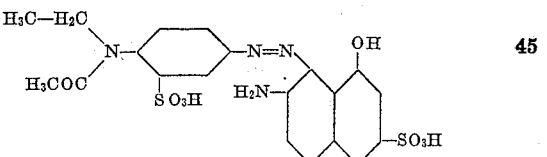

It is when dry a reddish brown water soluble powder and dyes wool from an acid bath bright scarlet shades of a good fastness to light and a good levelling power.

Similar dyestuffs are obtained by using as diazocomponent the diazo compounds of 1-amino-4-benzoyl-N-methylamino benzene-3-sulfonic acid and 1-amino-5-methyl-4-acetyl-N-methylaminobenzene-3-sulfonic acid.

*Example 3*

When combining 24 parts of 2-amino-8-hydroxy-naphthalene-6-sulfonic acid with the diazocompound of 29.4 parts of 1-amino-4-acetyl-aminobenzene-3-sulfonic acid, the formed monoazodyestuff of the formula:

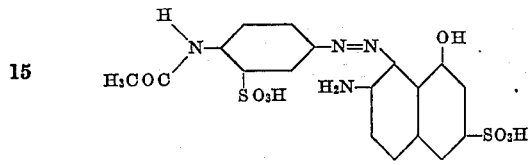

is when dry a reddish brown water soluble powder and dyes the animal fibers from an acid bath bright yellowish red shades.

*Example 4*

The diazocompound of 25.7 parts of 1-amino-4-acetyl-N-methyl - aminobenzene-3-sulfonic acid methylamide is combined in an acid medium with a suspension of 24 parts of 2-amino-8-hydroxy-naphthalene-6-sulfonic acid. The formed dyestuff of the formula:

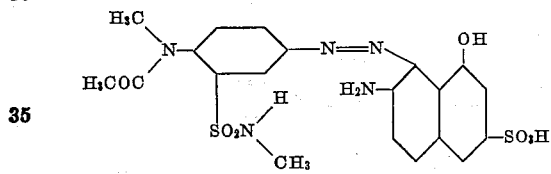

is when dry a reddish brown water soluble powder and dyes wool from an acid bath yellowish red shades of a good fastness to light and a good levelling power.

Similar dyestuffs are obtained when using as diazocomponent the diazocompounds of for instance 1 - amino-4-acetyl-N-methyl - aminobenzene-3-sulfonic acid-diethylamide, 1-amino-4-acetyl-N-methyl - aminobenzene-3-sulfonic acid mono- or di - hydroxy-ethylamide, 1-amino-4-acetyl-N-methyl-amino-benzene-3-sulfonic acid amide, 1-amino-4-acetyl-N-methyl - aminobenzene-3-sulfonic acid-cyclohexylamide, 1-amino-4-acetyl-N-cyclohexylaminobenzene - 3 - sulfonic acid-methylamide and 1 - amino-4-benzoyl - N-ethylaminobenzene-3-sulfonic acid - methylamide.

*Example 5*

The diazocompound of 36.5 parts of 1-amino-4-acetyl-N-methylaminobenzene-3 - sulfonic acid-methyl-amide-ethanesulfonic acid is combined in an acid medium with a suspension of 24 parts of 2-amino-8-hydroxynaphthalene-6-sulfonic acid. The formed dyestuff of the formula:

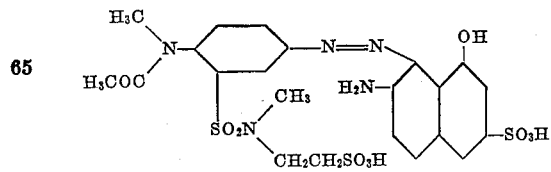

is when dry a reddish brown water-soluble powder and dyes the animal fibers yellowish shades of a good fastness to light.

Similar dyestuffs are obtained when using as diazocomponent for instance the diazocompounds of 1-amino-4-acyl - N - alkylamino-benzene - 3 - sulfonic acid-amido-ethane-sulfonic acids or -butylamido-ethane-sulfonic acids or corresponding amido acetic acids for instance one of the formula:

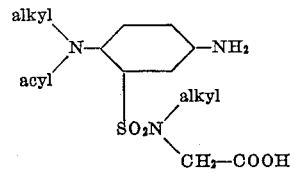

I claim:
1. Monoazodyestuffs of the general formula:

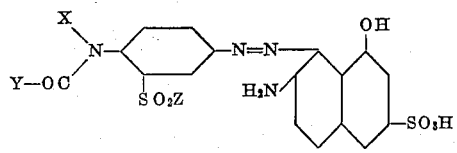

wherein X represents hydrogen or an alkyl, aralkyl, hexahydrophenyl or phenyl radicle, Y the methyl or phenyl radicle and Z represents OH or the grouping

$R_1$ and $R_2$ standing for hydrogen, alkyl or cycloalkyl which dyestuffs are water-soluble mostly reddish brown powders and dye the animal fibers very equal and bright reddish shades of the desired yellowish tinge.

2. The monoazodyestuff of the formula:

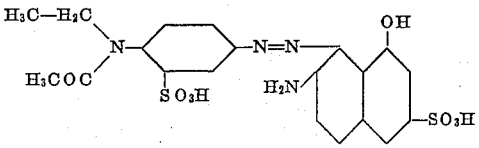

which dyestuff is when dry a reddish brown water-soluble powder and dyes wool from an acid bath bright scarlet shades of a good fastness to light and a good levelling power.

3. The monoazodyestuff of the formula:

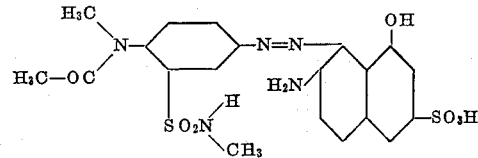

which dyestuff is when dry a reddish brown water soluble powder and dyes wool from an acid bath yellowish red shades of a good fastness to light and a good levelling power.

4. The monoazodyestuff of the formula:

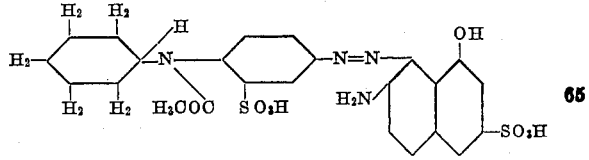

which is when dry a reddish brown water soluble powder and dyes wool and silk from an acid bath bright scarlet shades of a good fastness to light, washing and perspiration.

RICHARD FLEISCHHAUER.